(12) United States Patent  (10) Patent No.: US 8,708,545 B1
Chiu et al.  (45) Date of Patent: Apr. 29, 2014

(54) FRAME STRUCTURE OF LIGHT MODULE

(71) Applicant: Radiant Opto-Electronics (Nanjing) Co., Ltd., Nanjing (CN)

(72) Inventors: Yi-Jen Chiu, Kaohsiung (TW); Ma-Xin Liu, Kaohsiung (TW)

(73) Assignee: Radiant Opto-Electronics (Nanjing) Co., Ltd., Nanjing (CN)

( * ) Notice: Subject to any disclaimer, the term of this patent is extended or adjusted under 35 U.S.C. 154(b) by 0 days.

(21) Appl. No.: 13/794,786

(22) Filed: Mar. 11, 2013

(30) Foreign Application Priority Data

Jan. 25, 2013 (TW) .............................. 102102944 U

(51) Int. Cl.
 *G02B 6/36* (2006.01)
(52) U.S. Cl.
 USPC ............................ 362/633; 362/634; 362/97.1
(58) Field of Classification Search
 CPC ............ G02F 1/1335; G02F 1/133524; G02F 1/133602; G02F 1/133608; G02F 1/133615; G02B 6/0011; G02B 6/0081; G02B 6/0086
 USPC .......... 362/97.1, 97.2, 632, 633, 634; 349/58, 349/60
 See application file for complete search history.

(56) References Cited

U.S. PATENT DOCUMENTS

| | | | | |
|---|---|---|---|---|
| 6,542,206 B1* | 4/2003 | Saito | ............................... | 349/58 |
| 6,870,582 B2* | 3/2005 | Hayashimoto et al. | ......... | 349/58 |
| 7,543,975 B2* | 6/2009 | Yuan et al. | .................... | 362/632 |
| 8,164,705 B2* | 4/2012 | Hsiao et al. | ..................... | 349/58 |
| 8,233,015 B2* | 7/2012 | Lee | ............................... | 345/156 |
| 8,449,167 B2* | 5/2013 | Wakaki | ........................ | 362/633 |
| 8,467,008 B2* | 6/2013 | Chang | ............................. | 349/58 |
| 8,477,257 B2* | 7/2013 | Nakano | .......................... | 349/58 |
| 2006/0146577 A1* | 7/2006 | Hsieh et al. | .................... | 362/633 |
| 2008/0123370 A1* | 5/2008 | Huang et al. | .................. | 362/633 |
| 2008/0170416 A1* | 7/2008 | Yuan et al. | ..................... | 362/633 |

* cited by examiner

*Primary Examiner* — Thomas Sember
(74) *Attorney, Agent, or Firm* — CKC & Partners Co., Ltd.

(57) ABSTRACT

A frame structure of a light module is described. The frame structure includes a rear plate including first side plates, a plastic frame and a front frame. Each first side plate is set with at least one fixing hole and includes top positioning protrusions. The plastic frame includes second side plates disposed on the first side plates. Each second side plate includes a connecting part disposed on the first side plate, at least one fixing element connected to the connecting part and lodged in the fixing hole, and positioning elements protruded on the connecting part. Each positioning element has a positioning slot. The top positioning protrusions are embedded in the positioning slots. The front frame includes side rims disposed on the second side plates. Each side rim is set with positioning holes. The positioning elements of each second side plate are embedded in the positioning holes.

11 Claims, 11 Drawing Sheets

FRAME STRUCTURE OF LIGHT MODULE

RELATED APPLICATIONS

This application claims priority to Taiwan Application Serial Number 102102944, filed Jan. 25, 2013, which are herein incorporated by reference.

FIELD OF THE INVENTION

The present invention relates to a frame, and more particularly to a frame structure of a light module.

BACKGROUND OF THE INVENTION

Refer to FIG. 1 and FIG. 2. FIG. 1 and FIG. 2 are a schematic diagram showing the assembling of a portion of a frame structure of a typical backlight module and a three-dimensional diagram showing the portion of the frame structure of the typical backlight module respectively. A frame structure 132 of a backlight module mainly includes a rear plate 100, a plastic frame 110 and a front frame 120. In the frame structure 132, the rear plate 100 mainly includes a bottom plate 102 and a plurality of side plates 104. The side plates 104 are connected to outer edges of the bottom plate 102. In order to integrate the rear plate 100, plastic frame 110 and the front frame 120, each side plate 104 is usually set with one or more embosses 106, and a top surface of the side plate 104 is set with a plurality of positioning elements 108.

The plastic frame 110 includes side plates 112 and side plates 114. The side plates 114 are correspondingly connected to outer edges of the side plates 112. A bottom edge of each side plate 114 is set with one or more embosses 116. A quantity of the concaves 116 is equal to that of the embosses 106, and a width of the concaves 116 is about equal to that of the embosses 106. On the other hand, each side plate 112 is set with a plurality of positioning holes 118. A quantity of the positioning holes 118 is equal to that of the positioning elements 108, and a size of the positioning holes 118 is slightly larger than that of the positioning elements 108.

The front frame 120 includes side plates 122 and side plates 124. The side plates 124 are correspondingly connected to outer edges of the side plates 122. A bottom edge of each side plate 124 is set with one or more holes 126. A quantity of the holes 126 is equal to that of the embosses 106 of the rear plate 100, and a size of the holes 126 is slightly less than or equal to that of the embosses 106. In addition, each side plate 122 is similarly set with a plurality of positioning holes 128. A quantity of the positioning holes 128 is equal to that of the positioning elements 108 of the rear plate 100, and a size of the positioning holes 128 is slightly larger than that of the positioning elements 108.

As shown in FIG. 1 and FIG. 2, when assembling the frame structure 132 of the backlight module, the plastic frame 110 is disposed on the side plates 104 of the rear plate 100 to respectively install the embosses 106 of the rear plate 100 into the concaves 116 of the plastic frame 110 and to respectively install the positioning elements 108 of the rear plate 100 into the positioning holes 118 of the plastic frame 110. Then, the front frame 120 is disposed on the plastic frame 110 to respectively install the embosses 106 of the rear plate 100 into the holes 126 of the front frame 120 and to respectively install the positioning elements 108 of the rear plate 100 into the positioning holes 128 of the front frame 120.

As shown in FIG. 2, after completing the assembling of the frame structure 132 of the backlight module, an inner surface of each side plate 114 of the plastic frame 110 is adhered to an outer surface of the corresponding side plate 104 of the rear plate 100, and an inner surface of each side plate 124 of the front frame 120 is adhered to an outer surface of the corresponding side plate 114 of the plastic frame 110. Therefore, a thickness of the frame structure 132 is approximately equal to the sum of a thickness of the rear plate 100, a thickness of the plastic frame 110 and a thickness of the front frame 120. Accordingly, limiting to the thicknesses of the rear plate 100, the plastic frame 110 and the front frame 120, the thickness 130 of the frame structure 132 cannot be decreased.

Refer to FIG. 3A. FIG. 3A is a schematic diagram showing a conventional backlight module. A backlight module 216a uses a plurality of positioning pins 206 on a rear plate (not shown) to position and support a light guide plate 204. In the backlight module 216a, the light guide plate 204 is set with a plurality of concaves 208 for accommodating the positioning pins 206.

Refer to FIG. 3B. FIG. 3B is a schematic diagram showing another conventional backlight module. Similar to the backlight module 216a, a backlight module 216b uses a plurality of positioning elements 212 on a rear plate (not shown) to position and support a light guide plate 204. In the backlight module 216b, the light guide plate 204 is similarly set with a plurality of concaves 208 for accommodating the positioning elements 212.

However, as shown in FIG. 3A and FIG. 3B, in the backlight module 216a/216b, a side plate 202a/202b of a front frame 200a/200b needs to cover the positioning pins 206/the positioning elements 212, and the concaves 208 of the light guide plate 204. As a result, a thickness 210 of the side plate 202a of the front frame 200a of the backlight module 216a and a thickness 214 of the side plate 202b of the front frame 200b of the backlight module 216b cannot be effectively reduced.

SUMMARY OF THE INVENTION

Therefore, one aspect of the present invention is to provide a frame structure of a light module, which uses a coplanar positioning and wedging method to wedge a rear plate and a plastic frame in a same plane and to wedge the plastic frame and a front frame in a same plane. Accordingly, a width of a side frame of the light module is effectively decreased while strength and stability of wedging and positioning of each element of the frame structure are considered.

Another aspect of the present invention is to provide a frame structure of a light module, in which side plates of a rear plate are set with flexible positioning parts. A protruding portion of each positioning part can be used to fix a light guide plate, and the flexible positioning parts can provide the light guide plate with buffer space for impact. The positioning part is disposed on the side plate of the rear plate rather than a bottom plate, and the protruding portion is only slightly protrudes from an inner surface of the side plate, so that a width of a side frame of the light module is decreased while the fastening of the light guide plate is considered.

According to the aforementioned aspects, the present invention provides a frame structure of a light module, which is suitable to carry a light guide plate and at least one light source. The frame structure includes a rear plate, a plastic frame and a front frame. The rear plate includes a plurality of first side plates. Each first side plate is set with at least one fixing hole and includes at least two top positioning protrusions. The plastic frame includes a plurality of second side plates correspondingly disposed on the first side plates. Each second side plate includes a connecting part, at least one fixing element and at least two positioning elements. The connecting part is disposed on the corresponding first side plate. The at least one fixing element is connected to a bottom of the connecting part and is lodged in the at least one fixing hole of the corresponding first side plate. The at least two positioning elements are protruded on an outer surface of the connecting part. Each positioning element has a positioning slot, in which the top positioning protrusions of the corresponding first side plate are respectively embedded in the positioning slots. The front frame includes a plurality of side rims correspondingly disposed on the second side plates. Each side rim is set with at least two positioning holes. The positioning elements of the corresponding second side plate are respectively embedded in the positioning holes.

According to one embodiment of the present invention, the outer surface of the connecting part and an outer surface of the corresponding first side plate are coplanar.

According to another embodiment of the present invention, the at least one fixing element is a reversed hook shaped structure.

According to still another embodiment of the present invention, the at least one fixing element is a reversed T-shaped structure.

According to yet another embodiment of the present invention, a shape of the at least one fixing element is the same as that of the at least one fixing hole.

According to further another embodiment of the present invention, each side rim includes a third side plate and a fourth side plate connected to an edge of the third side plate. The positioning holes are set in the fourth side plate, and the fourth side plate is adhered to an outer surface of the corresponding first side plate.

According to further another embodiment of the present invention, an outer surface of the fourth side plate and an outer surface of each positioning element are coplanar.

According to further another embodiment of the present invention, a top surface of each positioning element, a top surface of each top positioning protrusion and a top surface of the third side plate are coplanar.

According to further another embodiment of the present invention, each second side plate further includes a compressing element protruding from an inner surface of the connecting part and extending above a rim of the light guide plate.

According to further another embodiment of the present invention, each first side plate further includes at least one positioning part and two grooves. An inner surface of the at least one positioning part includes a protruding portion. The grooves are respectively set at two opposite sides of the at least one positioning part.

According to further another embodiment of the present invention, the rear plate further includes a bottom plate, the first side plates are set on outer edges of the bottom plate, and the grooves extend from the corresponding first side plate to the bottom plate.

BRIEF DESCRIPTION OF THE DRAWINGS

The foregoing aspects and many of the attendant advantages of this invention are more readily appreciated as the same become better understood by reference to the following detailed description, when taken in conjunction with the accompanying drawings, wherein.

DETAILED DESCRIPTION OF THE PREFERRED EMBODIMENT

Figure 1:
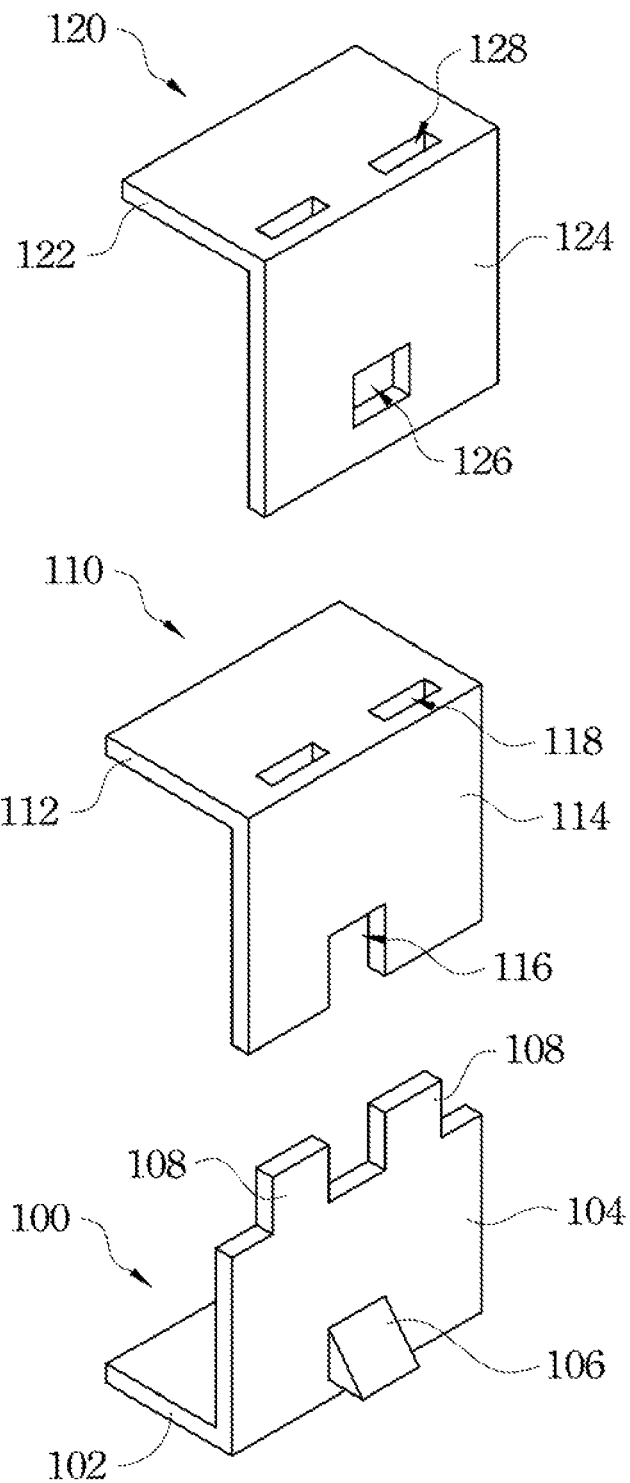
FIG. 1 is a schematic diagram showing the assembling of a portion of a frame structure of a typical backlight module.
Figure 2:
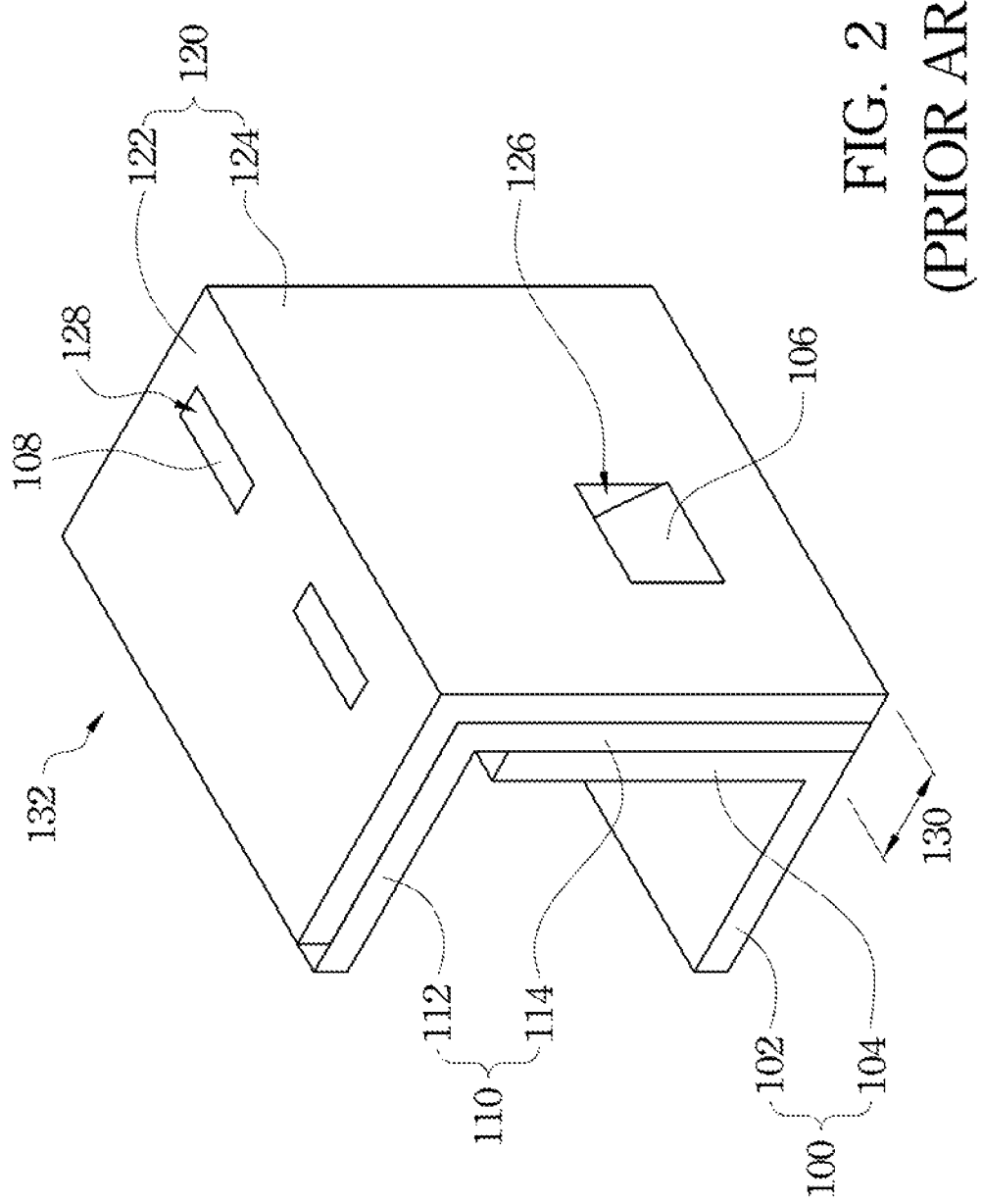
FIG. 2 is a three-dimensional diagram showing a portion of a frame structure of a typical backlight module.
Figure 3A:
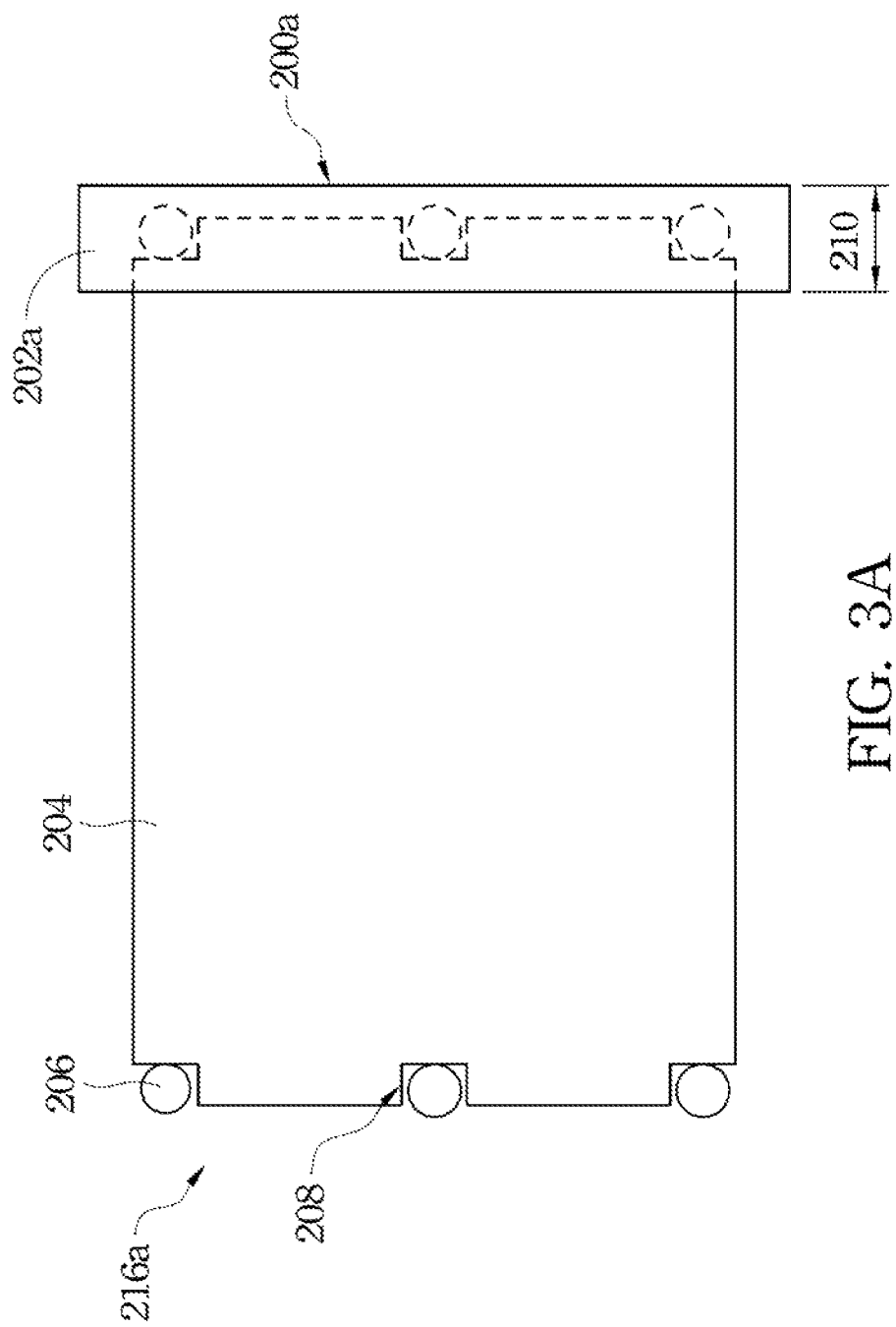
FIG. 3A is a schematic diagram showing a conventional backlight module.
Figure 3B:
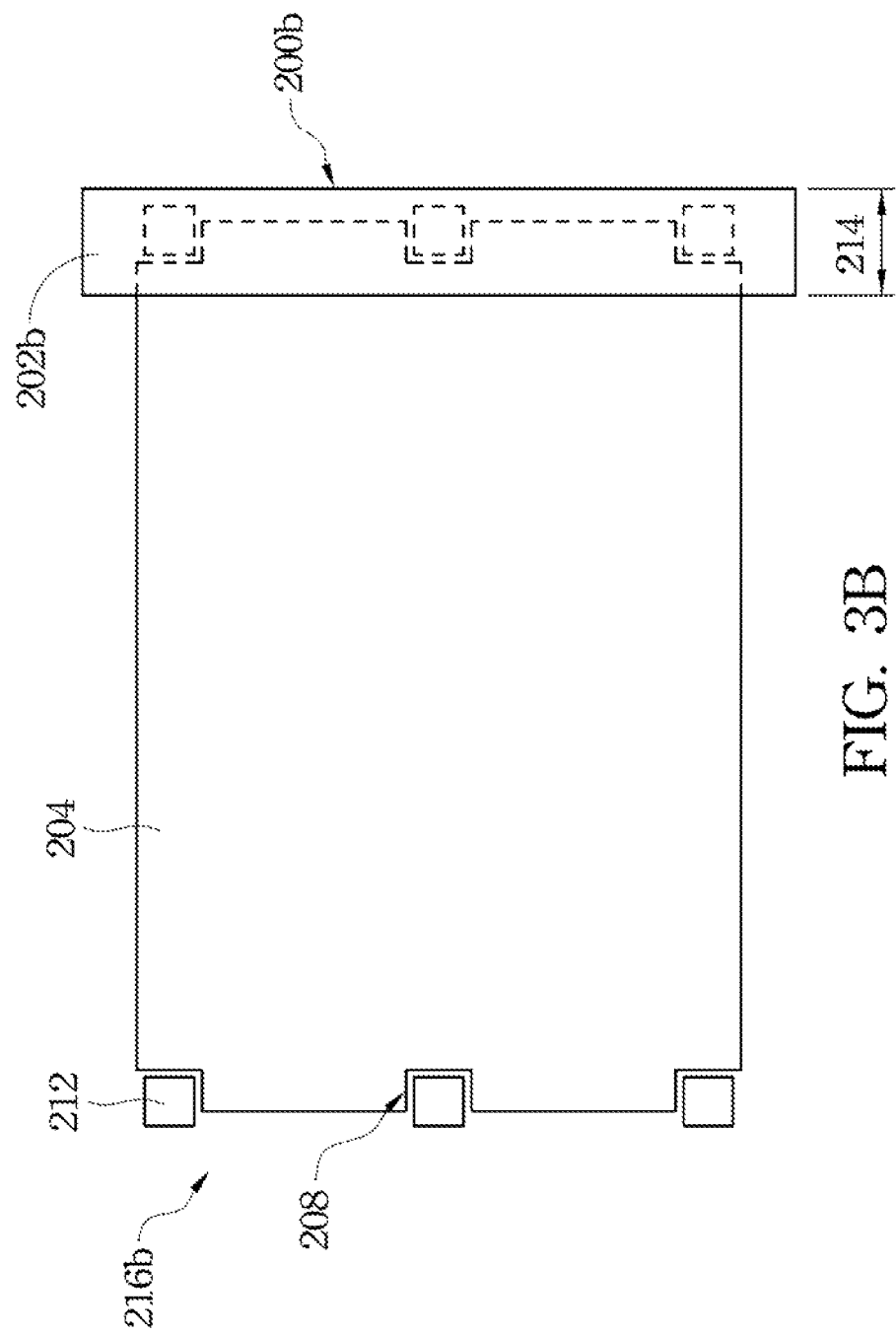
FIG. 3B is a schematic diagram showing another conventional backlight module.
Figure 4A:
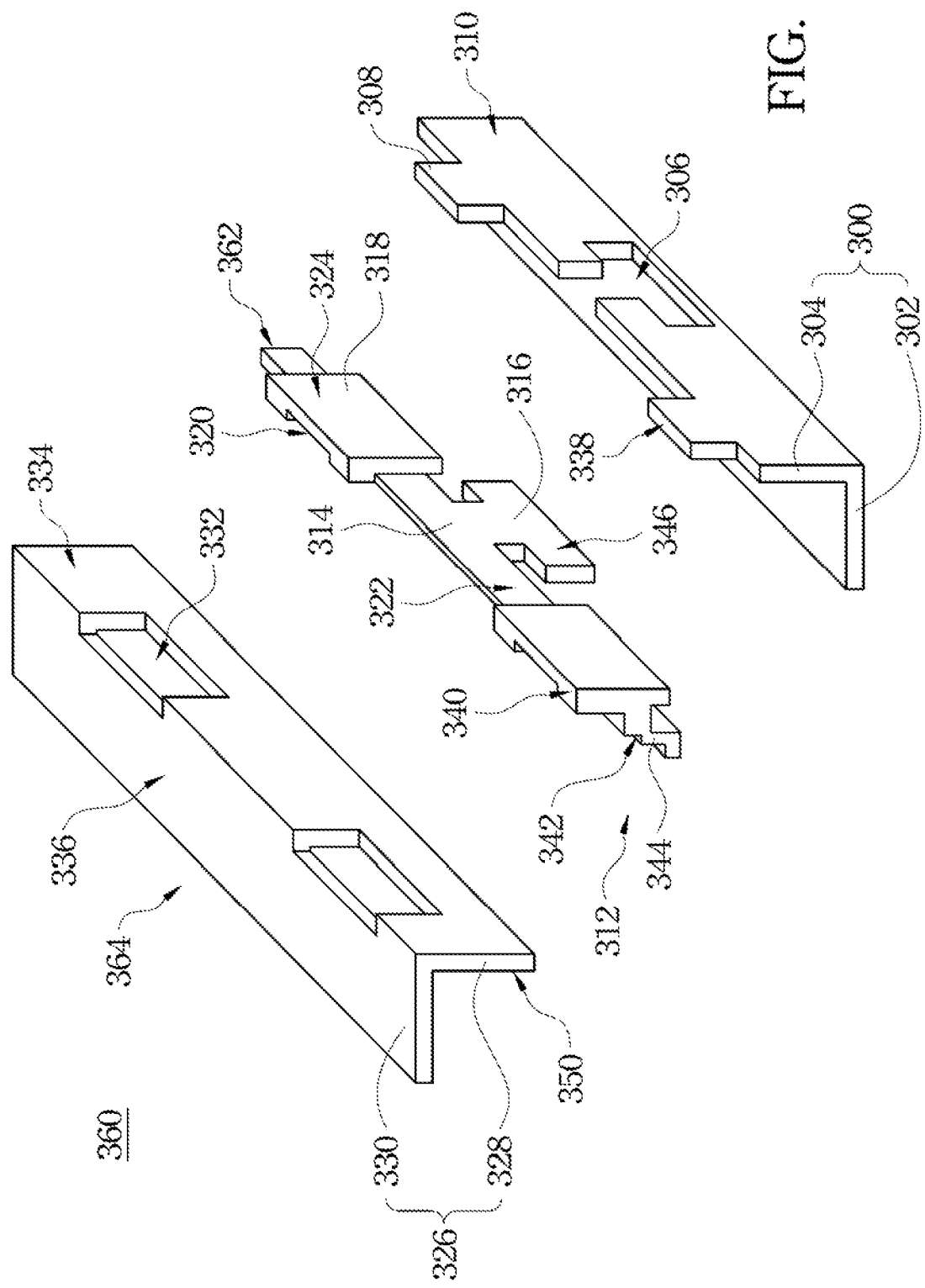
FIG. 4A through FIG. 4C are schematic diagrams showing an assembling flow of a frame structure of a light module in accordance with an embodiment of the present invention.
Figure 4B:
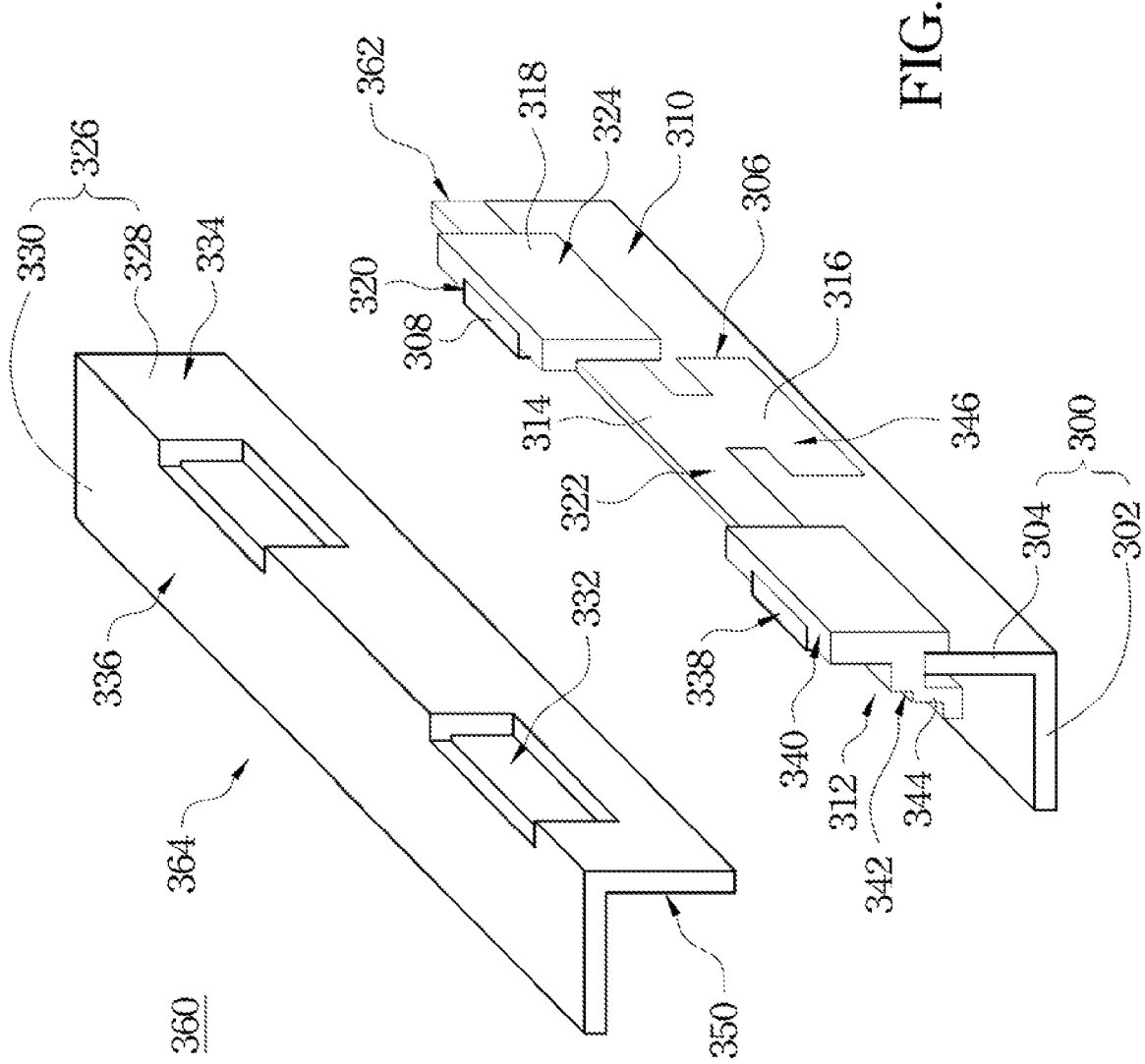
Figure 4C:
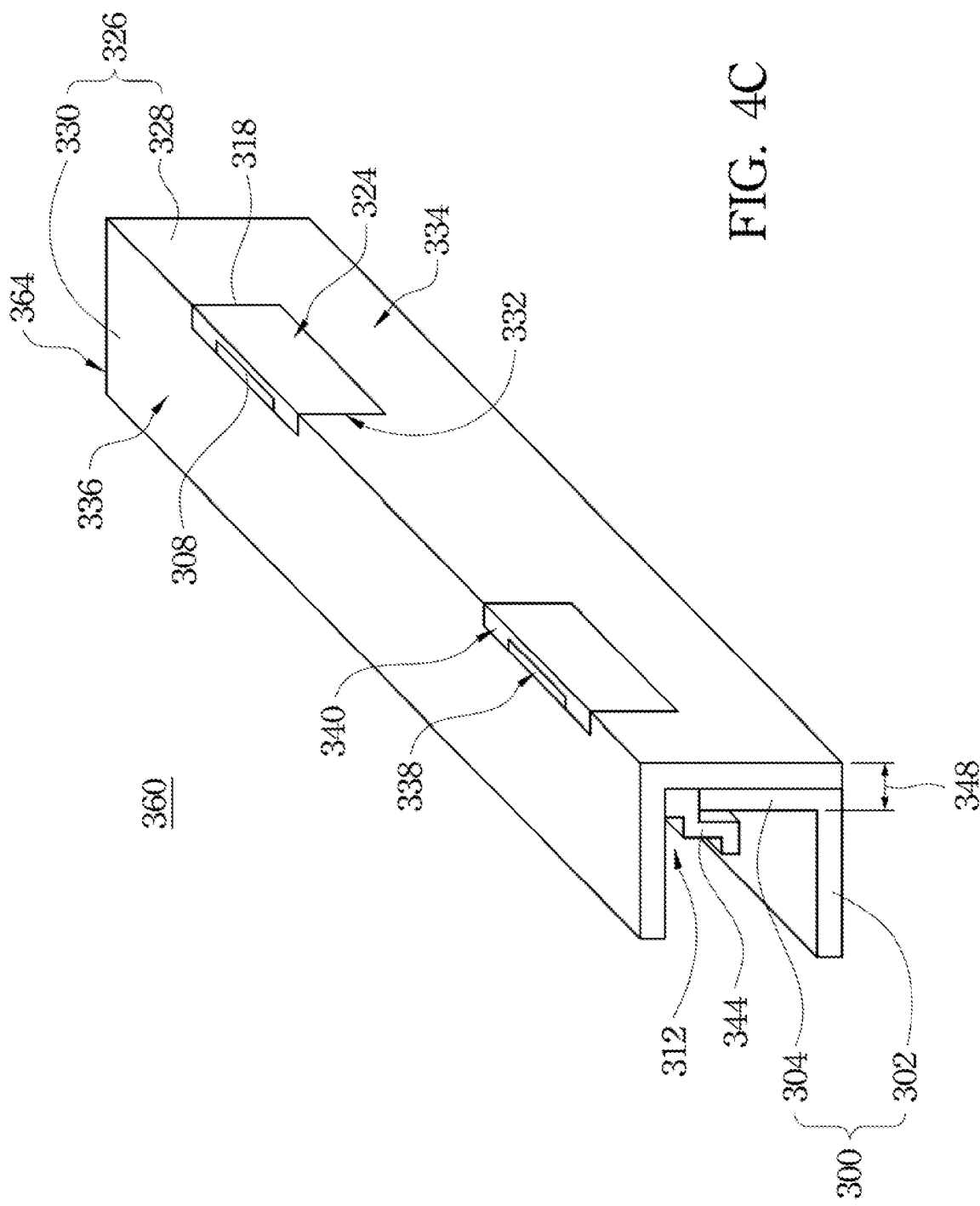

Typically, a light module applied in a flat panel display or a lighting device mainly includes a frame structure, a light guide plate and light sources. The frame structure can carry and protect the light guide plate and the light sources. The frame structure is set around the light guide plate, and the light sources are disposed within the frame structure and adjacent to one side of the light guide plate. Refer to FIG. 4A through FIG. 4C. FIG. 4A through FIG. 4C are schematic diagrams showing an assembling flow of a frame structure of a light module in accordance with an embodiment of the present invention. In the present embodiment, a frame structure 360 of a light module may be, for example, in a rectangle shape, and FIG. 4A through FIG. 4C only illustrate a local structure of one side of the frame structure 360.

As shown in FIG. 4A, the frame structure 360 mainly includes a rear plate 300, a plastic frame 312 and a front frame 364. Materials of the rear plate 300 and the front frame 364 may be metal, for example. The rear plate 300 may include a plurality of first side plates 304, in which the first side plates 304 are connected with each other to form a frame structure. The rear plate 300 may further include a bottom plate 302, and the first side plates 304 are set on outer edges of the bottom plate 302. Each first side plate 304 may include at least two top positioning protrusions 308 and at least one fixing hole 306 passing therethrough. In each first side plate 304, the top positioning protrusions 308 are disposed on the top of the first side plate 304, and the fixing hole 306 may be located between the two top positioning protrusions 308. In one exemplary embodiment, an opening of the fixing hole 306 is located on a top surface of the first side plate 304, and a gauge of the fixing hole 306 is smaller than an average bore diameter of the fixing hole 306.

The plastic frame 312 may include a plurality of second side plates 362, in which the second side plates 362 are connected with each other to form a frame structure similarly. The plastic frame 312 is disposed on the rear plate 300, and the second side plates 362 are correspondingly disposed on the first side plates 304 respectively. Each second side plate 362 mainly includes a connecting part 314, at least one fixing element 316 and at least two positioning elements 318. The connecting part 314 can connect the fixing element 316 and the positioning elements 318. The fixing element 316 is connected to a bottom of the connecting part 314, and may be located between the two positioning elements 318. In addition, the fixing element 316 may be lodged in the fixing hole 306 of the rear plate 300. A shape of the fixing element 316 may be the same as or different from that of the corresponding fixing hole 306. In one exemplary embodiment, the fixing element 316 extends downward from the bottom of the connecting part 314, and an outer surface 346 of the fixing element 316 and an outer surface 322 of the connecting part 314 may be coplanar. The fixing element 316 may be in various shapes including regular shapes or irregular shapes. In some examples, the fixing element 316 may be a reversed hook shaped structure or a reversed T-shaped structure to prevent the fixing element 316 from departing from the fixing hole 306 of the rear plate 300, so as to stabilize the combination of the plastic frame 312 and the rear plate 300.

Furthermore, the positioning elements 318 protrude from the outer surface 322 of the connecting part 314, i.e. an outer surface 324 of each positioning element 318 and the outer surface 322 of the connecting part 314 are not coplanar. Moreover, each positioning element 318 is set with a positioning slot 320. The positioning protrusions 308 of the first side plates 304 of the rear plate 300 may be correspondingly embedded in the positioning slots 320.

In one exemplary embodiment, each second side plate 362 of the plastic frame 312 may further selectively include a compressing element 344. The compressing element 344 protrudes from an inner surface 342 of the connecting part 314 and extends above a rim of the light guide plate, which is disposed in the inner of the frame structure 360. Therefore, with the compressing elements 344, the light guide plate of the light module can be pressed and fixed within the frame structure 360.

The front structure 364 includes a plurality of side rims 326, in which the side rims 326 are connected with each other to form a frame structure similarly. The front frame 364 is disposed on the rear plate 300 and the plastic frame 312, and the side rims 326 are correspondingly disposed on the second side plates 362 of the plastic frame 312 respectively. Each side rim 326 may be set with at least two positioning holes 332. The positioning elements 318 of the second side plate 362 corresponding to the side rim 326 may be respectively embedded in the positioning holes 332.

In one exemplary embodiment, each side rim 326 may include a third side plate 330 and a fourth side plate 328, in which the fourth side plate 328 is connected to an edge of the third side plate 330. In addition, the positioning holes 332 of each side rim 326 are set in the fourth side plate 328 and closely adjacent to the third side plate 330. When the positioning elements 318 of the second side plates 362 of the plastic frame 312 are respectively embedded into the positioning holes 332 of the corresponding side rims 326, the fourth side plates 328 of the side rims 326 can be closely adjacent to the first side plates 304 of the rear plate 300 respectively, and even, inner surfaces 350 of the fourth side plates 328 can be respectively attached to outer surfaces 310 of the first side plates 304.

As shown in FIG. 4B, when assembling the frame structure 360, the plastic frame 312 may be firstly disposed on the rear plate 300 to correspondingly locate the second side plates 362 of the plastic frame 312 on the first side plates 304 of the rear plate 300. Simultaneously, the connecting parts 314 of the second side plates 362 are disposed on the corresponding first side plates 304, and the fixing elements 316 are lodged in the fixing holes 306 of the corresponding first side plates 304. In addition, the top positioning protrusions 308 of the first side plates 304 are respectively embedded in the positioning slots 320 of the corresponding second side plates 362. Furthermore, the compressing elements 344 of the plastic frame 312 respectively protrude from the inner surfaces of the corresponding first side plates 304.

In one exemplary embodiment, after the plastic frame 312 and the rear plate 300 are combined, the outer surfaces 322 of the connecting parts 314, the outer surfaces 346 of the fixing elements 316 and the outer surfaces 310 of the corresponding first side plates 304 may be coplanar. However, in some exemplary embodiments, the outer surfaces 346 of the fixing elements 316 may protrude from the outer surfaces 310 of the corresponding first side plates 304, or may sink in the outer surfaces 310 of the corresponding first side plates 304. In addition, top surfaces 338 of the top positioning protrusions 308 of the rear plate 300 and top surfaces 340 of the second side plates 362 of the plastic frame 312 may be coplanar. However, in some exemplary embodiments, the top surfaces 338 of the top positioning protrusions 308 may protrude from the top surfaces 340 of the corresponding second side plates 362, or may sink in the top surfaces 340 of the corresponding second side plates 362.

After the plastic frame 312 is disposed on the first side plates 304 of the rear plate 300, such as shown in FIG. 4C, the front frame 364 is disposed on the plastic frame 312 and the rear plate 300 to correspondingly locate the side rims 326 of the front frame 364 on the second side plates 362 of the plastic frame 312. In addition, the positioning elements 318 of the second side plates 362 are respectively embedded into the positioning holes 332 of the fourth side plates 328 of the corresponding side rims 326.

In one exemplary embodiment, after the front frame 364 and the plastic frame 312 are combined, the outer surfaces 334 of the fourth side plates 328 and the outer surfaces 324 of the positioning elements 318 of the corresponding second side plates 362 may be coplanar. However, in some exemplary embodiments, the outer surfaces 334 of the fourth side plates 328 may protrude from the outer surfaces 324 of the positioning elements 318 of the corresponding second side plates 362, or may sink in the outer surfaces 324 of the positioning elements 318 of the corresponding second side plates 362.

In addition, the top surfaces 338 of the top positioning protrusions 308 of the rear plate 300, the top surfaces 340 of the corresponding positioning elements 318 of the plastic frame 312 and the top surfaces 336 of the corresponding third side plate 330 of the front frame 364 may be coplanar. However, in some exemplary embodiments, the top surfaces 338 of the top positioning protrusions 308 may protrude from the top surfaces 340 of the corresponding second side plates 362 and the top surfaces 336 of the corresponding third side plate 330, may protrude from the top surfaces 340 of the corresponding second side plates 362 but be coplanar with the top surfaces 336 of the corresponding third side plate 330, may sink in the top surfaces 340 of the corresponding second side plates 362 and the top surfaces 336 of the corresponding third side plate 330, or may sink in the top surfaces 336 of the corresponding third side plate 330 but be coplanar with the top surfaces 340 of the corresponding second side plates 362.

Refer to FIG. 4C again. In the assembled frame structure 360, the rear plate 300 and the plastic frame 312 of the frame structure 360 are wedged in a same plane, and the plastic frame 312 and the front frame 364 are wedged in a same plane. Therefore, a thickness 348 of the frame structure 360 may be merely the sum of a thickness of the first side plate 304 of the rear plate 300 and a thickness of the fourth side plate 328 of the front frame 364. Accordingly, the thickness 348 of the frame structure 360 is effectively decreased to suit the design of the frame structure 360 to a light module product with a super narrow bezel while stability of wedging and positioning of the rear plate 300, the plastic frame 312 and the front frame 364, and the structural strength of the frame structure 360 are considered. Furthermore, the reduction of the thickness 348 of the frame structure 360 is also conducive to the increasing of a length of a light mixing area of the light sources, thereby effectively solving a hot spot problem of the light module.

In one exemplary example, the thickness 348 of the frame structure 360 can decrease to being less than 5 mm. In another exemplary example, the thickness 348 of the frame structure 360 can decrease to 3.5 mm.

In some exemplary embodiments, in order to increase the combination stability of the frame structure 360, one or more protrusions (not shown) may be selectively set on the first side plate 304 of the rear plate 300, and fixing holes (not shown) corresponding to the protrusions are set on the fourth side plate 304 of the front frame 364. After the protrusions are wedged in the fixing holes, the protrusions do not protrude from the outer surface 334 of the front frame 364, so that the thickness of the whole frame structure 360 is not affected. By correspondingly wedging the protrusions of the rear plate 300 and the fixing holes of the front frame 364, the combination strength among the rear plate 300, the plastic frame 312 and the front frame 364 can be further increased.

Figure 5A:
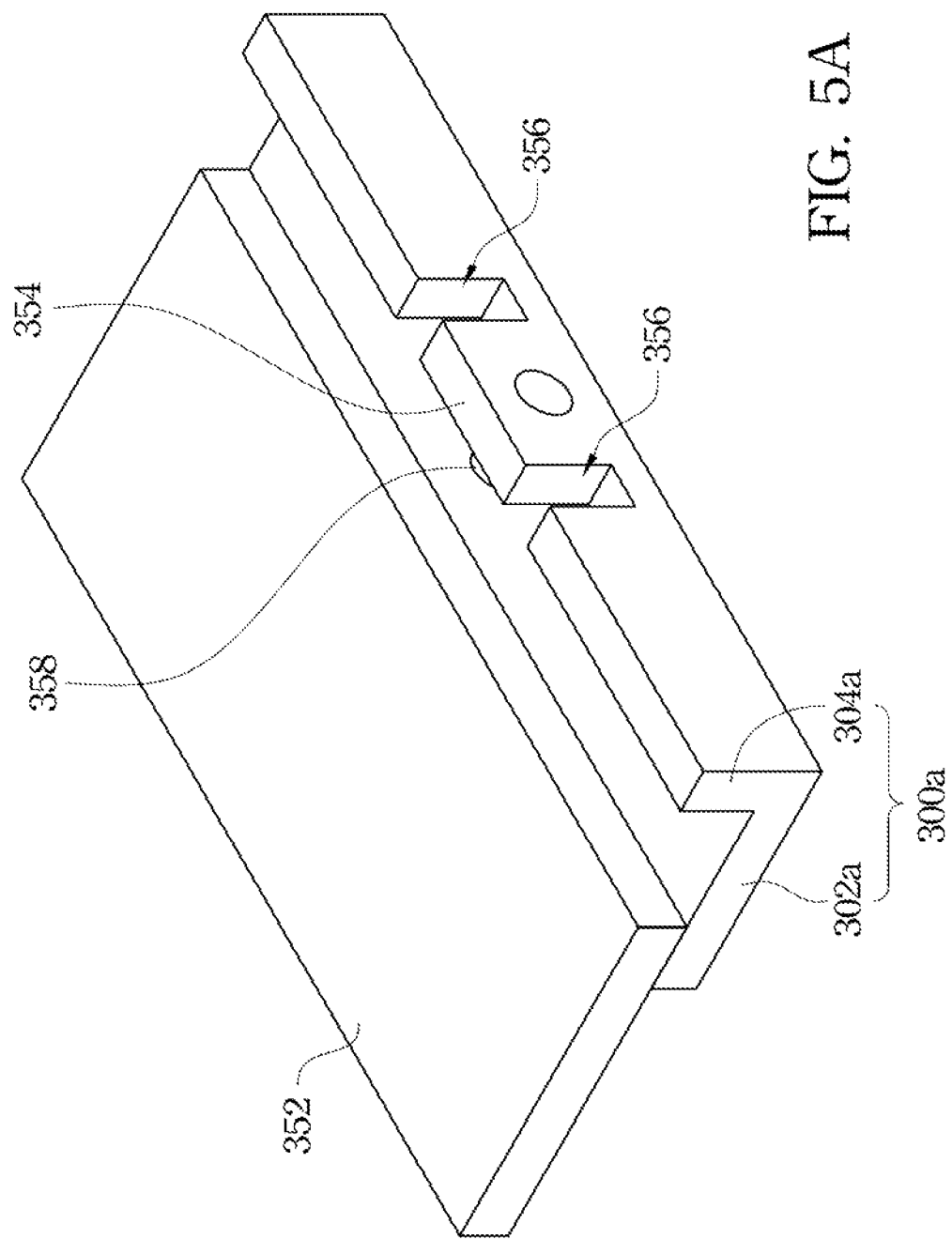
FIG. 5A is a schematic diagram showing an assembly of a rear plate of a frame structure and a light guide plate of a light module in accordance with another embodiment of the present invention.
Figure 5B:
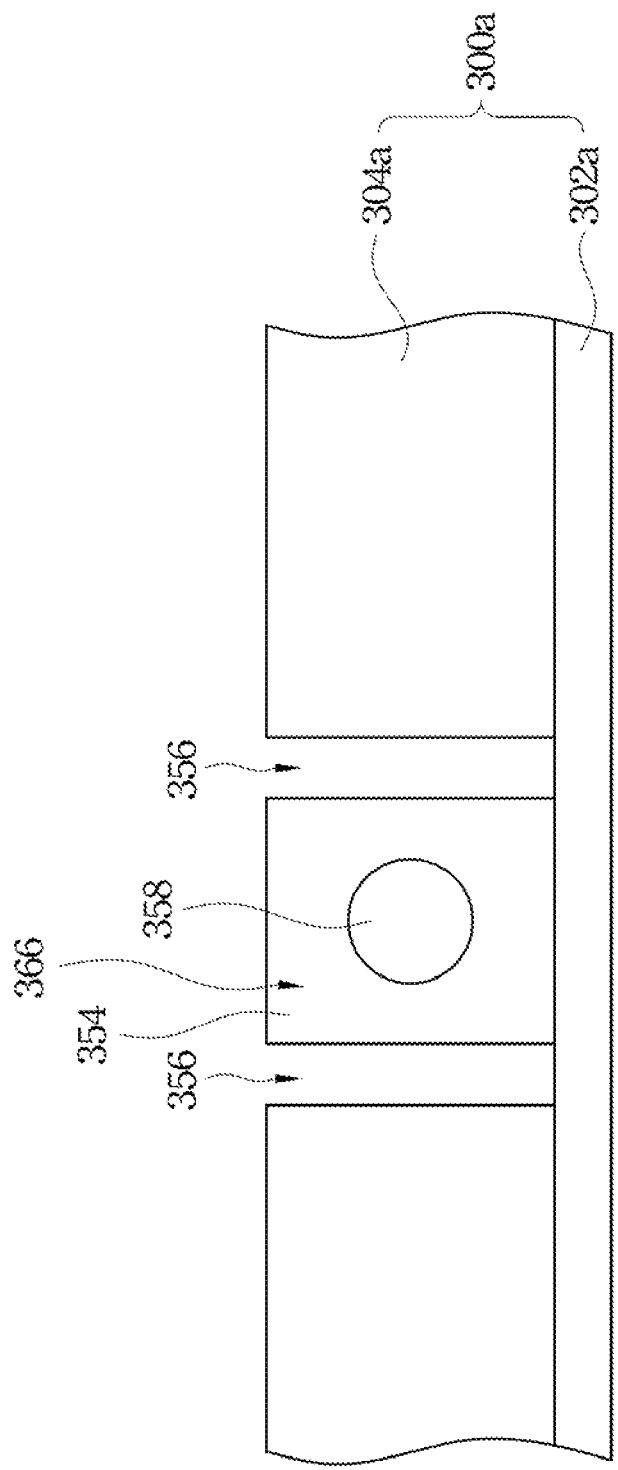
FIG. 5B illustrates a side view of the rear plate of the frame structure of the light module in accordance with another embodiment of the present invention.

In one exemplary example, a rear plate may be set with a flexible positioning mechanism to achieve effects of decreasing a width of a frame structure and fixing a light guide plate. Refer to FIG. 5A and FIG. 5B. FIG. 5A and FIG. 5B respectively illustrate a schematic diagram showing an assembly of a rear plate of a frame structure and a light guide plate of a light module and a side view of the rear plate in accordance with another embodiment of the present invention. In the present embodiment, in addition to the design of the rear plate 300 of the aforementioned embodiment, at least one first side plate 304a of a rear plate 300a may further include at least one positioning part 354 and two grooves 356.

As shown in FIG. 5A and FIG. 5B, in the first side plate 304a of the rear plate 300a, an inner surface 366 of the positioning part 354 includes a protruding portion 358. In one exemplary embodiment, the protruding portion 358 may be formed on the inner surface 366 of the positioning part 354 by punching the first side plate 304a to form an emboss on the first side plate 304a of the rear plate 300a. In addition, two grooves 356 are respectively formed at two opposite sides of each positioning part 354 of the first side plate 304a.

The positioning part 354 may flexibly move forward or backward in relation to a bottom plate 302a of the rear plate 300a by using grooves 356 to separate the positioning part 354 from the other parts of the first side plate 304a. Therefore, when a light guide plate 352 is disposed on the bottom plate 302a of the rear plate 300a, the protruding portion 358 on the inner surface 366 of the positioning part 354 of the first side plate 304a can fix the position of the light guide plate 352 in the rear plate 300a. In addition, the positioning part 354 has flexibility, thereby providing the light guide plate 352 with buffer space for movement to reduce the effect of the impact on the light guide plate 352.

The width of the frame structure the light module is effectively decreased while the positioning of the light guide plate 352 is achieved by directly forming the protruding portion 358 on the inner surface 366 of the positioning part 354 of the first side plate 304a of the rear plate 300a.

Figure 6:
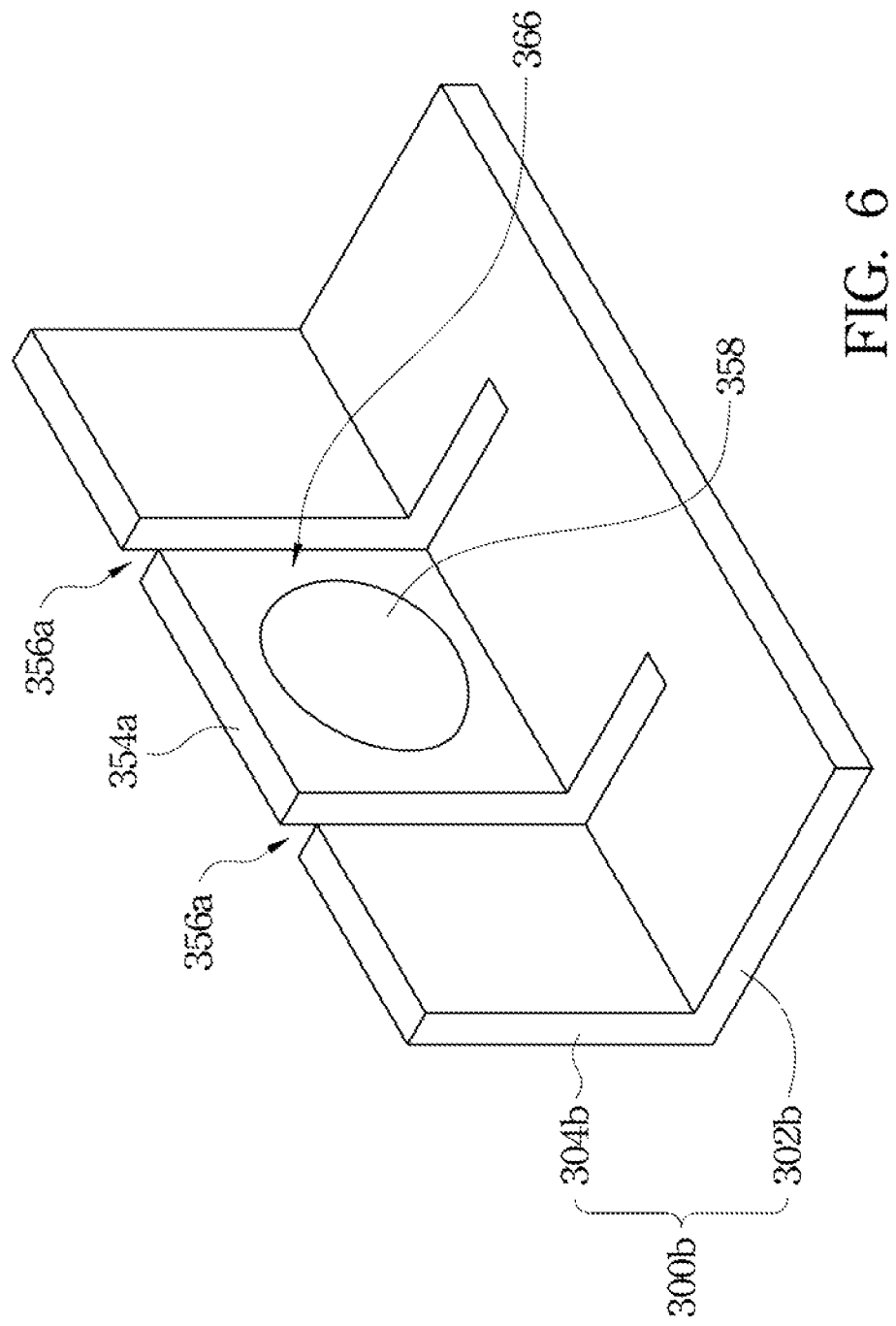
FIG. 6 is a three-dimensional diagram showing a portion of a rear plate of a frame structure of a light module in accordance with still another embodiment of the present invention.

Refer to FIG. 6. FIG. 6 is a three-dimensional diagram showing a portion of a rear plate of a frame structure of a light module in accordance with still another embodiment of the present invention. In the present embodiment, a structure of a rear plate 300b is substantially similar to that of the rear plate 300a of the aforementioned embodiment, a difference between the two structures is that grooves 356a of the rear plate 300b both extends from a first side plate 304b to a bottom plate 302b of the rear plate 300b. Therefore, flexibility of a positioning part 354a is increased to provide a light guide plate (not shown) with lager buffer space for movement, thereby further reducing the effect of the impact on the light guide plate.

Figure 7:
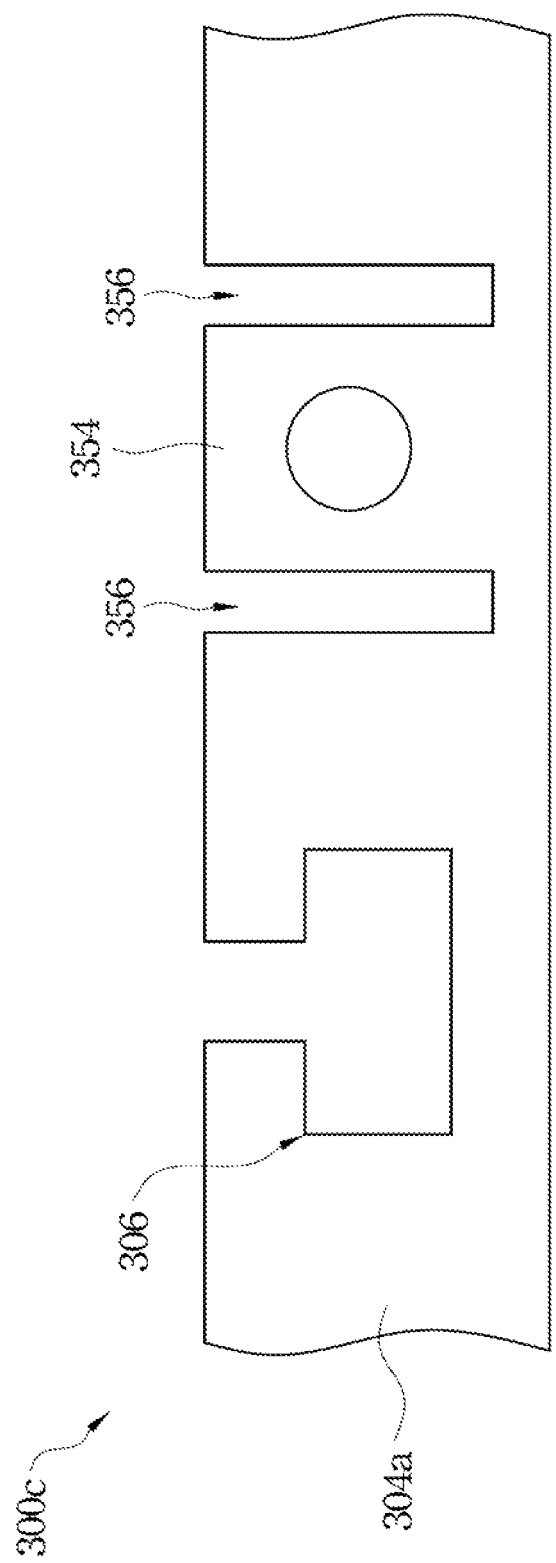
FIG. 7 illustrates a side view of a portion of a rear plate of a frame structure of a light module in accordance with yet another embodiment of the present invention.

Refer to FIG. 7. FIG. 7 illustrates a side view of a portion of a rear plate of a frame structure of a light module in accordance with yet another embodiment of the present invention. In the present embodiment, a structure of a rear plate 300c is substantially similar to that of the rear plate 300a of the aforementioned embodiment, a difference between the two structures is that in addition to the positioning parts 354, the rear plate 300c further set with the positioning holes 306 of the rear plate 300 shown in FIG. 4A. Therefore, a width of a side frame of a light module is decreased while impact on a light guide plate is reduced.

According to the aforementioned embodiments of the present invention, one advantage of the present invention is that a frame structure of a light module uses a coplanar positioning and wedging method to wedge a rear plate and a plastic frame in a same plane and to wedge the plastic frame and a front frame in a same plane. Therefore, a width of a side frame of the light module is effectively decreased while strength and stability of wedging and positioning of each element of the frame structure are considered.

According to the aforementioned embodiments of the present invention, another advantage of the present invention is that side plates of a rear plate of a frame structure of a light module are set with flexible positioning parts. A protruding portion of each positioning part can be used to fix a light guide plate, and the flexible positioning parts can provide the light guide plate with buffer space for impact. The positioning part is disposed on the side plate of the rear plate rather than a bottom plate, and the protruding portion is only slightly protrudes from an inner surface of the side plate, so that a width of a side frame of the light module is decreased while the fastening of the light guide plate is considered.

As is understood by a person skilled in the art, the foregoing preferred embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A frame structure of a light module, which is suitable to carry a light guide plate and at least one light source, wherein the frame structure of the light module includes:
   a rear plate including a plurality of first side plates, wherein each of the first side plates is set with at least one fixing hole and includes at least two top positioning protrusions;
   a plastic frame including a plurality of second side plates correspondingly disposed on the first side plates, wherein each of the second side plates includes:
      a connecting part disposed on the corresponding first side plate;
      at least one fixing element connected to a bottom of the connecting part and lodged in the at least one fixing hole of the corresponding first side plate; and
      at least two positioning elements protruded on an outer surface of the connecting part, wherein each of the positioning elements has a positioning slot, and the top positioning protrusions of the corresponding first side plate are respectively embedded in the positioning slots; and a front frame including a plurality of side rims correspondingly disposed on the second side plates, wherein each of the side rims is set with at least two positioning holes, and the positioning elements of the corresponding second side plate are respectively embedded in the positioning holes.

2. The frame structure of the light module according to claim 1, wherein the outer surface of the connecting part and an outer surface of the corresponding first side plate are coplanar.

3. The frame structure of the light module according to claim 1, wherein the at least one fixing element is a reversed book shaped structure.

4. The frame structure of the light module according to claim 1, wherein the at least one fixing element is a reversed T-shaped structure.

5. The frame structure of the light module according to claim 1, wherein a shape of the at least one fixing element is the same as a shape of the at least one fixing hole.

6. The frame structure of the light module according to claim 1, wherein each of the side rims includes:
   a third side plate; and
   a fourth side plate connected to an edge of the third side plate, wherein the positioning holes are set in the fourth side plate, and the fourth side plate is adhered to an outer surface of the corresponding first side plate.

7. The frame structure of the light module according to claim 6, wherein an outer surface of the fourth side plate and an outer surface of each of the positioning elements are coplanar.

8. The frame structure of the light module according to claim 6, wherein a top surface of each of the positioning elements, a top surface of each of the top positioning protrusions and a top surface of the third side plate are coplanar.

9. The frame structure of the light module according to claim 1, wherein each of the second side plates further includes a compressing element protruding from an inner surface of the connecting part and extending above a rim of the light guide plate.

10. The frame structure of the light module according to claim 1, wherein each of the first side plates further includes:
    at least one positioning part, wherein an inner surface of the at least one positioning part includes a protruding portion; and
    two grooves respectively set at two opposite sides of the at least one positioning part.

11. The frame structure of the light module according to claim 10, wherein the rear plate further includes a bottom plate, the first side plates are set on outer edges of the bottom plate, and the grooves extend from the corresponding first side plate to the bottom plate.

* * * * *